US010750552B2

(12) United States Patent
Witkowski et al.

(10) Patent No.: US 10,750,552 B2
(45) Date of Patent: Aug. 18, 2020

(54) METHODS AND SYSTEMS FOR PAIRING USER DEVICE AND CONTENT APPLICATION

(71) Applicant: Comcast Cable Communications, LLC, Philadelphia, PA (US)

(72) Inventors: Bryan Kenneth Witkowski, Philadelphia, PA (US); Robert Dandrea, Furlong, PA (US); Brian Cherne, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 85 days.

(21) Appl. No.: 15/476,322

(22) Filed: Mar. 31, 2017

(65) Prior Publication Data

US 2018/0288811 A1    Oct. 4, 2018

(51) Int. Cl.
  *H04L 29/12* (2006.01)
  *H04L 12/66* (2006.01)
  *H04W 76/11* (2018.01)
  *H04W 76/38* (2018.01)

(52) U.S. Cl.
  CPC ......... *H04W 76/11* (2018.02); *H04L 61/2007* (2013.01); *H04W 76/38* (2018.02)

(58) Field of Classification Search
  CPC . H04W 76/021; H04W 76/068; H04W 48/14; H04W 40/02
  See application file for complete search history.

(56) References Cited

U.S. PATENT DOCUMENTS

| 6,772,331 | B1* | 8/2004 | Hind | G06F 21/445 |
| | | | | 713/151 |
| 8,103,247 | B2 | 1/2012 | Ananthanarayanan et al. | |
| 9,118,736 | B2* | 8/2015 | Miura | H04L 63/0876 |
| 9,490,998 | B1* | 11/2016 | Danciu | H04L 12/2818 |
| 9,730,255 | B1* | 8/2017 | Chu | H04L 65/403 |
| 9,801,219 | B2* | 10/2017 | Sonnino | H04W 76/14 |
| 2002/0194299 | A1* | 12/2002 | Yasaki | H04N 5/4403 |
| | | | | 709/217 |
| 2008/0320587 | A1* | 12/2008 | Vauclair | H04L 41/28 |
| | | | | 726/17 |
| 2009/0260064 | A1 | 10/2009 | McDowell et al. | |
| 2011/0035402 | A1* | 2/2011 | Agrawal | G06F 16/951 |
| | | | | 707/769 |
| 2011/0273625 | A1* | 11/2011 | McMahon | G06F 21/445 |
| | | | | 348/734 |
| 2012/0324076 | A1* | 12/2012 | Zerr | H04W 4/21 |
| | | | | 709/223 |
| 2013/0169571 | A1 | 7/2013 | Gai et al. | |
| 2014/0010099 | A1* | 1/2014 | Chiu | H04W 72/085 |
| | | | | 370/252 |
| 2015/0067163 | A1* | 3/2015 | Bahnsen | H04W 4/02 |
| | | | | 709/225 |

(Continued)

*Primary Examiner* — Rasheed Gidado
(74) *Attorney, Agent, or Firm* — BakerHostetler

(57) ABSTRACT

Methods and systems for pairing devices are disclosed. A user device may be used to navigate to a resource locator using. In response to a determination that an identifier associated with the user device matches at least one identifier associated with one or more devices accessing a first network, a paired communication may be established between the user device and a display device to facilitate control of one or more features of display device.

20 Claims, 7 Drawing Sheets

(56) References Cited

U.S. PATENT DOCUMENTS

| | | | |
|---|---|---|---|
| 2015/0372754 A1* | 12/2015 | Choi | G06F 21/35 398/130 |
| 2016/0021485 A1* | 1/2016 | Sallas | H04W 48/14 455/41.3 |
| 2016/0044122 A1* | 2/2016 | Sandholm | H04W 4/21 709/206 |

* cited by examiner

METHODS AND SYSTEMS FOR PAIRING USER DEVICE AND CONTENT APPLICATION

BACKGROUND

Utilizing mobile devices to control other devices such as televisions and first screen applications is increasingly common. In certain implementations, in order to enable the mobile device to control another device and/or application, a user may be prompted to provide credentials and identify a specific device for control. Such a process may be tedious for a user. Therefore, improvements in pairing devices are needed.

SUMMARY

Content providers such as service providers (e.g., Internet service providers) may provide services such as managing delivery and/or access to content. Services may include the generation and transmission of transport streams such as the streams including content and/or application data. Additionally or alternatively, the service providers may facilitate the determination of identifiers associated with devices (e.g., Internet protocol (IP) enabled devices) accessing such services. As an example, an Internet service provider may determine the currently assigned public-facing IP addresses associated with each device accessing a network service or associated with a particular network (e.g., premises network). The service provider may use the identifiers to pair one or more devices with each other.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
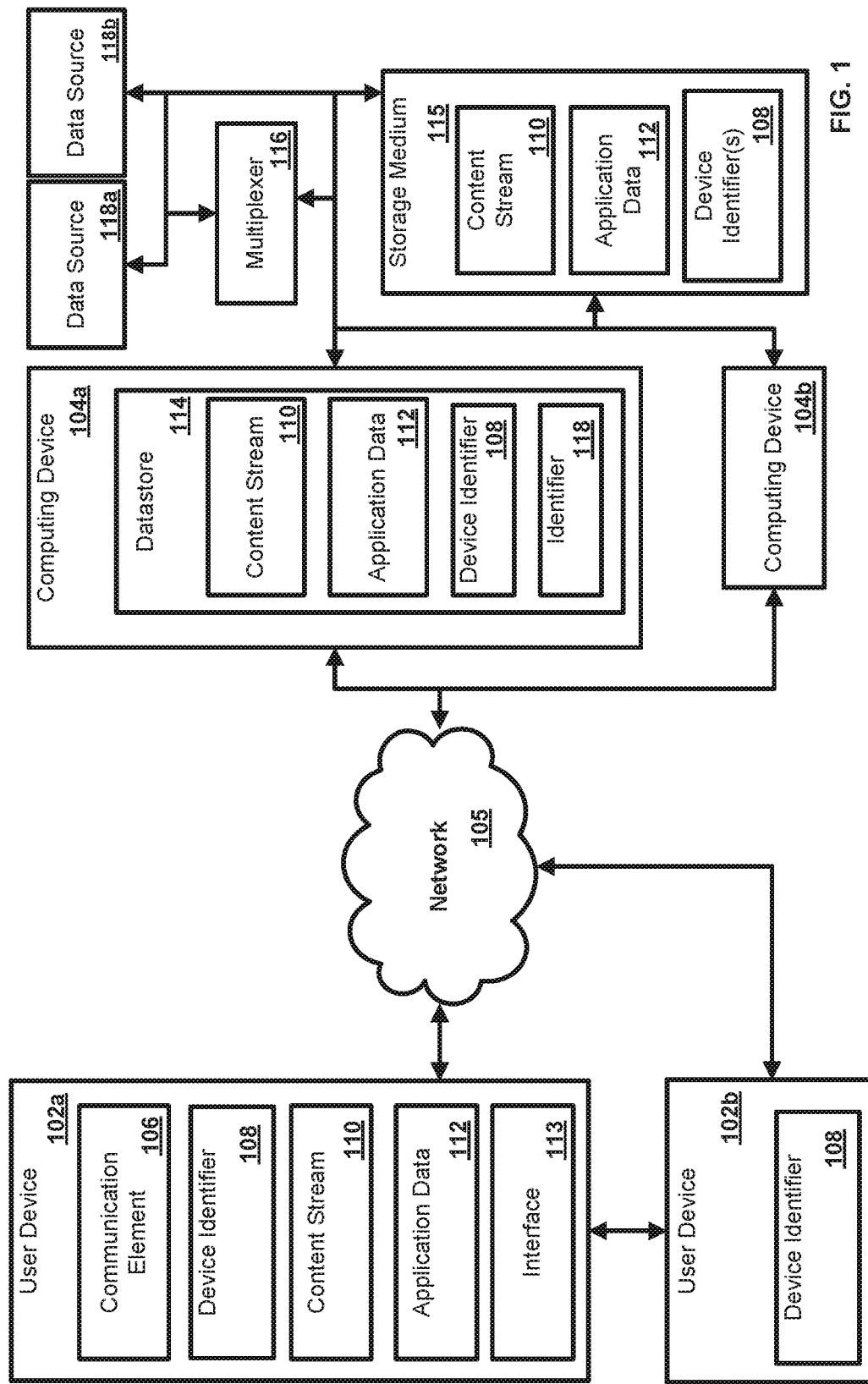
FIG. 1 is a block diagram of an example of a network.

One or more computing devices may be configured to facilitate the determination of identifiers associated with devices (e.g., IP-enabled devices) accessing services such as those related to the delivery and/or consumption of content. As an example, an Internet service provider may determine the currently assigned identifiers such as public-facing IP addresses associated with each device accessing a content service or associated with a particular network (e.g., premises network). The service provider may use the identifiers to pair one or more of devices with each other, which may facilitate the additional control features or functionality as compared to unpaired devices.

Pairing may include the association of two or more devices such that inputs (e.g., keystrokes, swipes, gestures, device movement, voice, etc.) provided via one device may be recognized synchronously by another device and/or applications. As such, various devices may be configured to grant authorization for tandem usage as a trusted agent (e.g., a paired device). Once paired, communication between at least the two devices may be bi-directional.

An application may be provided via a first device such as a set-top box, an over-the-top device, or a network-enabled television. The first device and/or one or more features of the application may be configured to be controlled by a second device, for example, a mobile device. To enable control by the second device, the first device and the second device may need to be paired.

Pairing may be facilitated using an identifier of the second device. For example, the first device may provide (e.g., render) a resource locator. A user may access the resource locator using the second device, for example, via a web browser executing via the second device. As such, the web browser may expose a public-facing device identifier to a web server hosting the resource locator. The device identifier exposed by the web browser may be associated with the second device accessing the resource locator. The exposed device identifier may be compared to one or more of a group of identifiers associated with devices accessing a particular network or at a particular location. In response to a determination that the device identifier associated with the second device matches at least one of the group of identifiers, the second device may be paired with the first device to facilitate control of the one or more features of the first device.

As another example, the resource locator may be known to the second device and/or applications associated with the second device. As such, if an application is executed by the second device, the resource locator may be automatically accessed. The access to the resource locator may be hidden from the user of the second device to facilitate a seamless user experience. However, this access of the resource locator my cause exposure of a device identifier associated with the second device. The exposed device identifier may be compared to one or more of a group of identifiers associated with devices accessing a particular network or at a particular location. In response to a determination that the device identifier associated with the second device matches at least one of the group of identifiers, the second device may be automatically paired with a first device to facilitate control of the one or more features of the first device.

A system may be configured to provide services such as network-related data services. FIG. 1 shows various aspects of an exemplary environment. Those skilled in the art will appreciate that methods may be used in various types of networks and systems that employ both digital and analog equipment. One skilled in the art will appreciate that provided herein is a functional description and that the respective functions may be performed by software, hardware, or a combination of software and hardware.

The network and system may comprise one or more user devices 102a, 102b in communication with one or more computing devices 104a, 104b such as a server, for example. The computing devices 104a, 104b may be located locally or remotely relative to the user devices 102a, 102b. As an example, the user devices 102a, 102b and the computing devices 104a, 104b may be in communication via a private and/or public network 105 such as the Internet. Other forms of communications may be used such as wired and wireless telecommunication channels, for example.

The user devices 102a, 102b may be an electronic device such as a computer, a smartphone, a laptop, a tablet, a set top box, a display device, or other device capable of communicating with the computing devices 104a, 104b. In certain aspects, a first user device 102a may be or comprise a set-top box, an over-the-top device, or a network-enabled and a second user device 102b may be or comprise a mobile device configured to control one or more features associated with the first user device 102a.

The user devices 102a, 102b may comprise a communication element 106 for providing an interface to a user to interact with the user devices 102a, 102b and/or the computing devices 104a, 104b. The communication element 106 may be any interface for presenting information to the user and receiving a user feedback such as an application client or a web browser (e.g., Internet Explorer, Mozilla Firefox, Google Chrome, Safari, or the like). Other software, hardware, and/or interfaces may be used to provide communication between the user and one or more of the user devices 102a, 102b and the computing devices 104a, 104b. As an example, the communication element 106 may request or query various files from a local source and/or a remote source. As a further example, the communication element 106 may transmit data to a local or remote device such as the computing devices 104a, 104b.

One or more of the user devices 102a, 102b may be associated with a user identifier or device identifier 108. As an example, the device identifier 108 may be any identifier, token, character, string, or the like, for differentiating one user or user device (e.g., user devices 102a, 102b) from another user or user device. In a further aspect, the device identifier 108 may identify a user or user device as belonging to a particular class of users or user devices. As a further example, the device identifier 108 may comprise information relating to the user device such as a manufacturer, a model or type of device, a service provider associated with the user devices 102a, 102b, a state of the user devices 102a, 102b, a locator, and/or a label or classifier. Other information may be represented by the device identifier 108.

The device identifier 108 may be persistent or may be temporary or periodic. As an example, the device identifier 108 may be assigned to each device associated with a network such as a local area network or premises network. As another example, the device identifier 108 may be one of a group of assignable network identifiers (e.g., IP addresses). In certain aspects, the device identifier 108 may be used in communication via the communication element 106 of a respective user device 102a, 102b. As an example, where the communication element 106 may comprise a web browser, the web browser may embed the device identifier 108 in communications (e.g., requests) transmitted over the network. As such, the device identifier 108 may be a detectable by a receiving web server and the web server may extract the device identifier 108 from the communications.

The user devices 102a, 102b may be configured to transmit and/or receive various signals such as a data signals transmitted via the Internet Protocol (IP) or other protocols. As an example, the signals may be transmitted and/or received between the user devices 102a, 102b and the computing devices 104a, 104b. As an example, the user devices 102a, 102b may transmit requests for content to a RTSP, MPEG, SDP, or other streaming server such as the computing device 104a. As another example, the user devices 102a, 102b may be configured to receive a content stream 110 such as a transport stream (e.g., in response to the request for content). The content stream 110 may, for example, be an MPEG transport stream or an IP video adaptive video stream such as HLS. Other standards and protocols may be used. The content stream 110 may be processed (e.g., decoded) by the user devices 102a, 102b to provide playback of the content comprised in the content stream 110, for example, via an interface 113 such as a display. As an example, the playback of the content may comprise video playback.

The user devices 102a, 102b may be configured to receive application data 112 such as binary application data. The application data 112 may comprise at least a portion of data that, when processed, may form an executable application. Such an application may be executed via the user devices 102a, 102b. As an example, the application may relate to the content received by the user devices 102a, 102b. However, the application may be independent of the content. As an example, the application data 112 required to compile the complete application may be divided into portions or data chunks.

As an illustrative example, as the user devices 102a, 102b provides playback of content from the transport stream, the application data 112 may be downloaded. Once the complete set of application data 112 has been received by the user devices 102a, 102b, the user devices 102a, 102b may process the application data 112 to execute an application, for example via the interface 113. Applications could be downloaded that are related to a broadcast network, program topic, user profile, user demographic, service level, advertiser, geographic location, or usage pattern. An application example would be a cooking application related to cooking program content. Another application example would be an educational children's application related to a children's television network. Another application example would be a sports application related to a sports programming usage pattern. The application may be persistently stored to the user devices 102a, 102b and/or may be removed (e.g., based on resource availability of the user devices 102a, 102b). In certain aspects, the application may communicate with a server such as an FTP, HTTP, or Restful server (e.g., computing device 104b) for providing a user experience to a user of the user devices 102a, 102b.

One or more of the computing devices 104a, 104b may be a server for communicating with the user devices 102a, 102b. As an example, the computing devices 104a, 104b may communicate with the user devices 102a, 102b for providing services such as streaming services and/or application-related services. The computing devices 104a, 104b may allow the user devices 102a, 102b to interact with remote resources such as data, devices, and files. As an example, the computing devices 104a, 104b may be configured as central location (e.g., a headend, or processing facility), which may receive content (e.g., data, input programming) from multiple sources. The computing devices 104a, 104b may combine content from various sources (e.g., data sources 118a, 118b) and may distribute the content to user (e.g., subscriber) locations via a distribution system.

One or more of the computing devices 104a, 104b may manage the communication between the user devices 102a, 102b and a datastore 114 for sending and receiving data therebetween. As an example, the datastore 114 may store a plurality of data sets (e.g., indexes, content items, data fragments, location identifiers, relational tables, user device identifiers (e.g., identifier 108) or records, network device identifiers (e.g., identifier 118), or other information. As a further example, the user devices 102a, 102b may request and/or receive (e.g., retrieve) a file from the datastore 114 such as a manifest of one or more location identifiers associated with one or more content items. The datastore 114 may store information for delivery to the user devices 102a, 102b such as the content stream 110 and/or the application data 112. In another aspect, a storage medium 115 physically and/or logically remote from one or more of the computing devices 104a, 104b may be configured to store information such as the content stream 110 and/or the application data 112.

Data from one or more sources (e.g., data sources 118a, 118b) may be multiplexed via multiplexer 116 to generate a transport stream. The multiplexer 116 may comprise an encoder or transcoder for encoding the source data into the transport stream such as a MPEG transport stream. The multiplexer 116 may be any device, system, apparatus, or the like to combine, encode, and/or transcode the source data into a transport stream.

Multiplexer 116 may receive video content from the data source 118a and may receive application data from the data source 118b and may combine the application data with the video content into a single transport stream for delivery to the user devices 102a, 102b. As an example, one or more of the data sources 118a, 118b may comprise a content provider for providing one or more of audio content, video content, data, news feeds, sports programming, advertisements, and the like. As another example, one or more of the data sources 118a, 118b may comprise a network data feed transmitting the data stream to users such as subscribers or clients. As a further example, one or more of the data sources 118a, 118b an application server store, a source for binary applications, and/or a firmware source.

Figure 2:
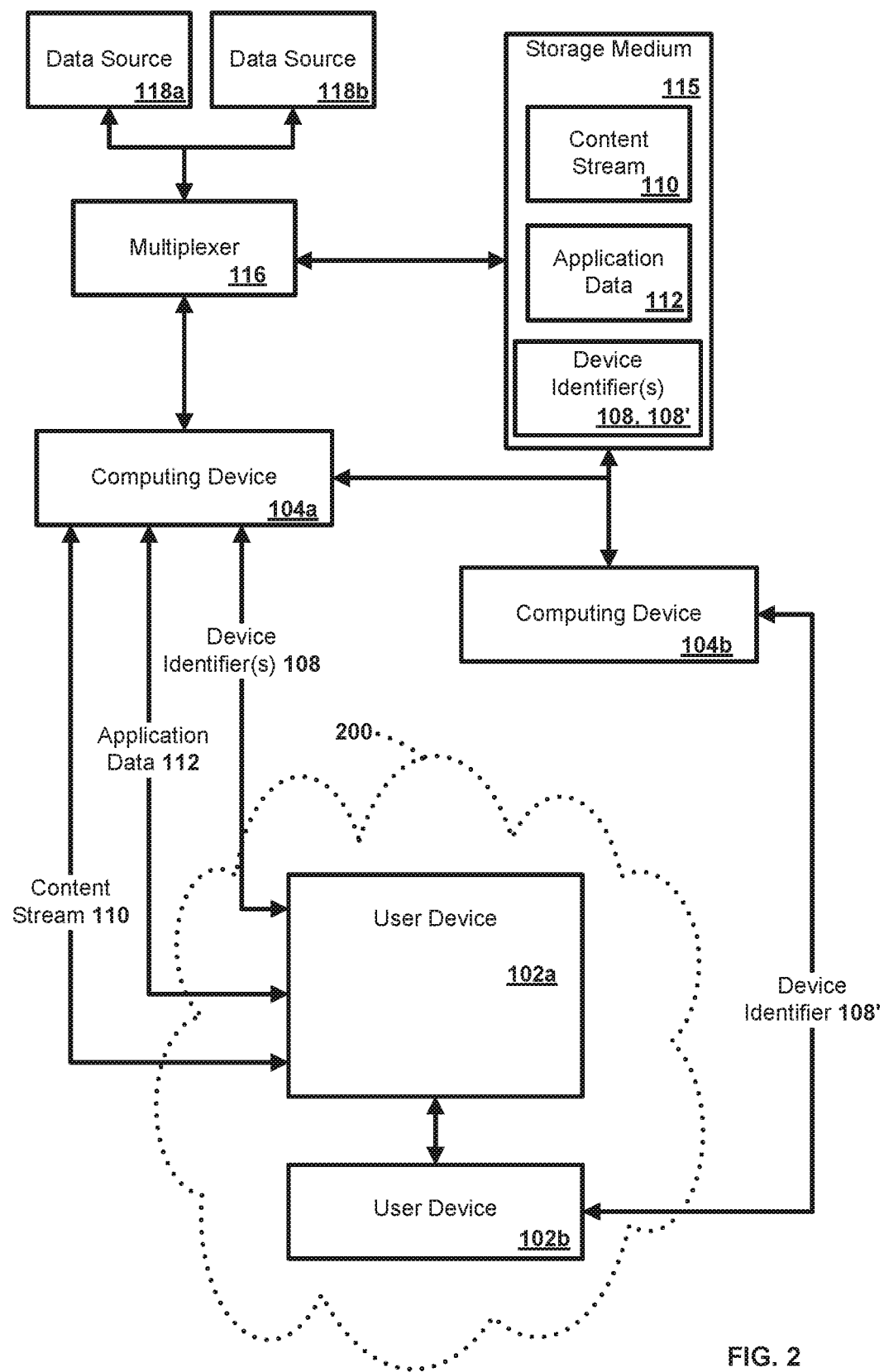
FIG. 2 is a block diagram of an example of system architecture.

As illustrated in FIG. 2, the computing device 104a may be configured as a streaming server such as and RTSP, MPEG, or SDP server, for example. As such, the user device 102a may transmit requests for particular content to be delivered from the computing device 104a. As such, the requested content may be one or more of a video content stream 110 and an application data 112 received via one or more data sources 118a, 118b and/or storage medium 115. The requested content may be transmitted to the user devices 102a via a transport stream, which may comprise data processed via multiplexer 116. Although the multiplexer 116 is shown, other mechanisms for generating and transmitting data may be used. The transport stream may comprise a multi-program transport stream or a single program transport stream. The user device 102a receiving the transport stream may decode the transport stream to provide playback of the underlying content such as video or application data.

An application may be provided (e.g., rendered) via user device 102a such as a set-top box, an over-the-top device, or a network-enabled television, for example. Other devices may be used. The user device 102a and/or one or more features of the application may be configured to be controlled by a second device such as the user device 102b, for example. To enable control by the user device 102b, the user device 102a and the user device 102b may need to be paired. Pairing may be facilitated using a device identifier 108' of the user device 102b. For example, the user device 102a may provide (e.g., render) a resource locator. A user may access the resource locator using the user device 102b, for example, via a web browser executing via the user device 102b. As such, the web browser may expose the public-facing device identifier 108' to the computing device 104b (e.g., web server) hosting the resource locator. The exposed device identifier 108' may be compared to one or more of a group of device identifiers 108 associated with devices accessing a particular network 200 or at a particular location. As an example, each device, including the user device 102b, that accesses (e.g., joins, associates with, etc.) the network 200 may be assigned one of the device identifiers 108. As such, the device identifiers 108 may be transmitted upstream to the computing device 104a or other device for storage and subsequent processing (e.g., comparison). In response to a determination that the device identifier 108' associated with the user device 102b matches at least one of the group of device identifiers 108, the user device 102b may be paired with the user device 102a to facilitate control of the one or more features of the user device 102a.

As another example, the resource locator may be known to the user device 102b and/or applications associated with the user device 102b. As such, if an application is executed by the user device 102b, the resource locator may be automatically accessed. The access to the resource locator may be hidden from the user of the user device 102b to facilitate a seamless user experience. However, this access of the resource locator may cause exposure of the device identifier 108 associated with the user device 102b. The exposed device identifier 108 may be compared to one or more of a group of identifiers associated with devices accessing a particular network or at a particular location. In response to a determination that the device identifier 108 associated with the user device 102b matches at least one of the group of identifiers, the user device 102b may be automatically paired with user device 102a to facilitate control of the one or more features of the user device 102a. As such, the user devices 102a, 102b may automatically paired based at least on a device identifier and without requiring a user to provide credentials or pairing codes via one or more of the user devices 102a, 102b. Although the systems and methods described herein may be implemented without requiring a user to provide credentials or a pairing code, it is understood that such user interaction may be allowed, for example, where the device identifier is unable to be discovered.

Figure 3:
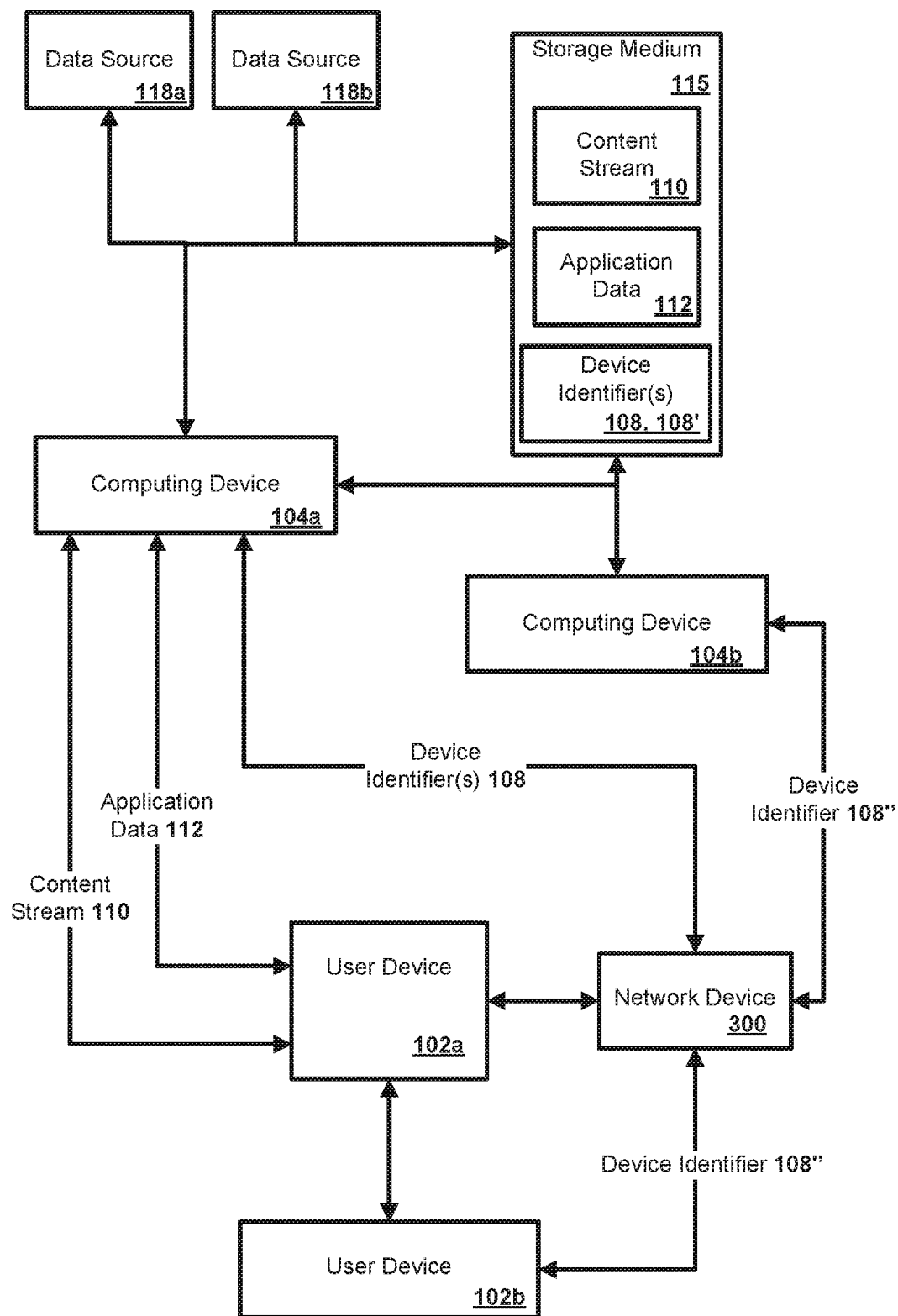
FIG. 3 is a block diagram of an example of system architecture.

As illustrated in FIG. 3, the computing device 104a may be configured as a streaming server such as and RTSP, MPEG, or SDP server, for example. As such, the user device 102a may transmit requests for particular content to be delivered from the computing device 104a. As such, the requested content may be one or more of a video content stream 110 and an application data 112 received via one or more data sources 118a, 118b and/or storage medium 115. The requested content may be transmitted to the user devices 102a via a transport stream. Other communication mechanisms may be used.

An application may be provided (e.g., rendered) via user device 102a such as a set-top box, an over-the-top device, or a network-enabled television, for example. Other devices may be used. The user device 102a and/or one or more features of the application may be configured to be controlled by a second device such as the user device 102b, for example. To enable control by the user device 102b, the user device 102a and the user device 102b may need to be paired. Pairing may be facilitated using a device identifier 108" of the user device 102b. For example, the user device 102a may provide (e.g., render) a resource locator. A user may access the resource locator using the user device 102b, for example, via a web browser executing via the user device 102b. As such, the web browser may expose the public-facing device identifier 108" to the computing device 104b (e.g., web server) hosting the resource locator. The exposed device identifier 108" may be compared to one or more of a group of device identifiers 108 associated with devices accessing a network device 300 or at a particular location. As an example, the network device 300 may assign one of the device identifiers 108 to each device (including the user device 102b) that accesses (e.g., joins, associates with, etc.) a network via the network device 300. As such, the device identifiers 108 may be transmitted upstream to the computing device 104*a* or other device for storage and subsequent processing (e.g., comparison).

One or more computing devices such as the computing device 104*a* may be configured to compare the received exposed device identifier 108″ to one or more of the group of device identifiers 108. Such a comparison may be a record comparison, a bit-for-bit comparison, an alphanumeric comparison, and the like. In response to a determination that the device identifier 108″ associated with the user device 102*b* matches (e.g., exactly or with a pre-determine threshold) at least one of the group of device identifiers 108, the user device 102*b* may be paired with the user device 102*a* to facilitate control of the one or more features of the user device 102*a*. The one or more features of the user device 102*a* may comprise a game control, a content playback control, an audio control, and a screen navigation control. Other features may be controlled.

Figure 4:
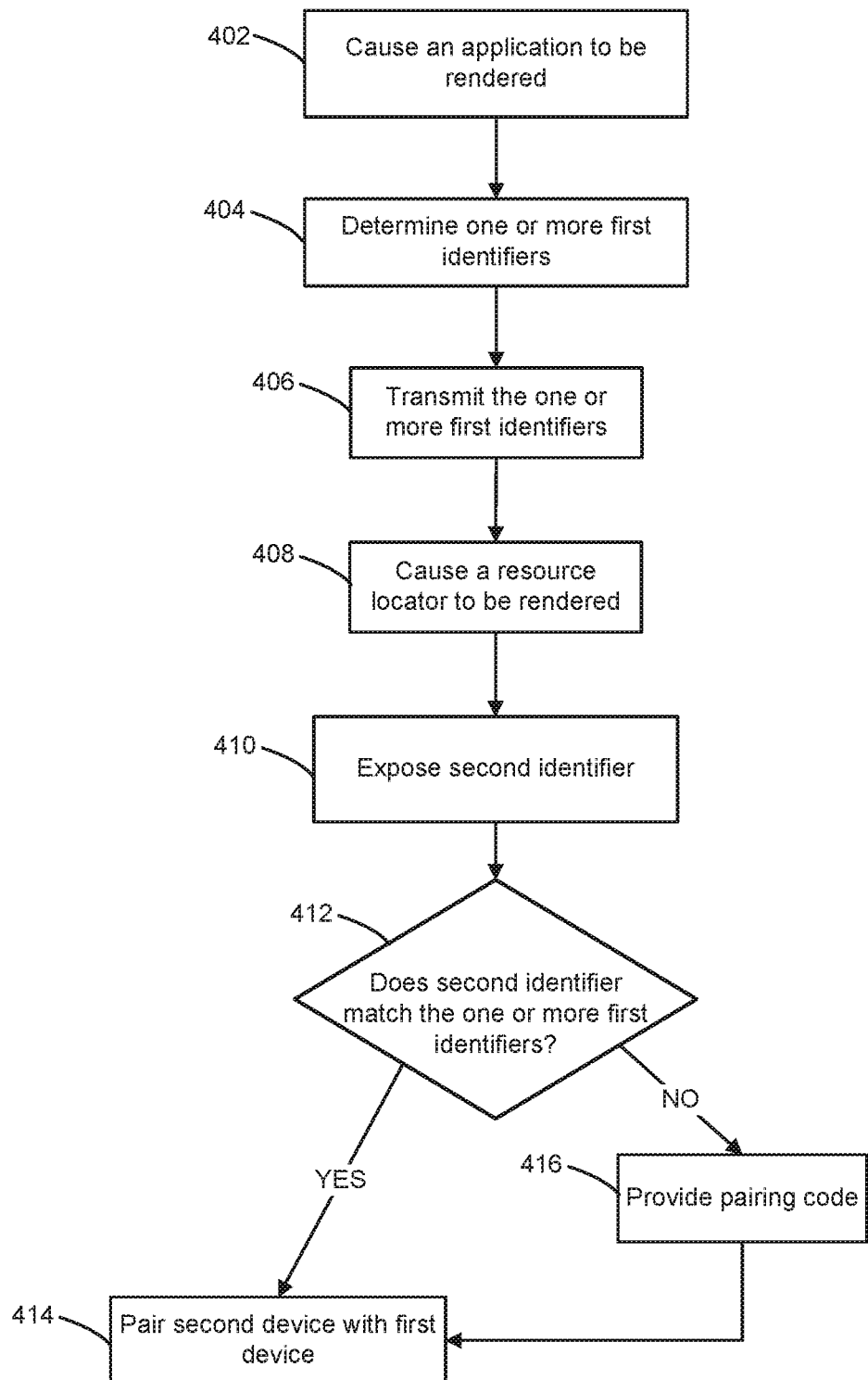
FIG. 4 is a flow chart of an example of a method.

FIG. 4 shows an example method. In step 402, an application may be caused to be rendered, for example, on a display associated with a first device. The first device may be or comprise any device capable of receiving application data and causing an application to be rendered. One or more features of the application may be configured to be controlled by a second device, such as a mobile device. In certain aspects, the first device and the second device may be associated with the same premises network (e.g., local area network), such as joined with the same network.

In step 404, one or more first identifiers associated with one or more devices accessing the premises network may be determined. As an example, the one or more devices accessing the premises network may be assigned one of a group of the first identifiers such as network addresses (e.g., IP addresses). The assigned first identifiers may be stored and/or may be transmitted, at step 406, to an upstream device via a network. As an example, a network device such as a gateway may facilitate access to the premises network. The network device may determine the first identifiers assigned to each device associated with the premises network and may cause the first identifiers to be transmitted to a second network device such as a storage device, server, or other computing device.

In step 408, a resource locator may be caused to be rendered on the display associated with the first device. As such, a user may input the resource locator into the second device or otherwise cause the second device to navigate to the resource locator. Additionally or alternatively, the resource locator may be automatically accessed by a second device without requiring the resource locator to be rendered on the display of the first device. For example, the resource locator may be provided to the second device without requiring a user input. Accessing the resource locator by the second device facilitates exposure of a second identifier associated with the second device, at 410. As an example, a user may cause the second device to navigate to the resource locator. As another example, the second device may automatically navigate to the resource locator based on a pre-determined event such as the initiation of an application, a logic event, or the execution of a particular program.

The second identifier may be compared to the one or more first identifiers to determine if the second identifier matches one or more of the first identifiers, at step 412. As an example, the first identifier(s) may be written to a data store (e.g., SQL, NoSQL, etc.). The second device may be caused to call the data store and may attempt to match the second identifier to the first identifier(s). If the second identifier has a match in the data store, pairing is successful and the second device may access information (e.g., associated with the matched first identifier on the data store) instructing the second device on how to communicate with the first device. As a further example, the pairing of the second device and the first device may include a time limit. At the expiration of the time limit, the second device may be required to re-associate with the first device.

In response to receiving an indication that the second identifier matches at least one of the first identifiers, the second device may be paired with the first device, at step 414, to facilitate control of the one or more features of the application by the second device. The one or more features of the first device may comprise a game control, a content playback control, an audio control, and a screen navigation control. Other control features may be used. If the second identifier does not match one or more of the first identifiers, a paring code may be provided to the user, at step 416, which may be used to pair the second device to the first device, at step 414.

Figure 5:
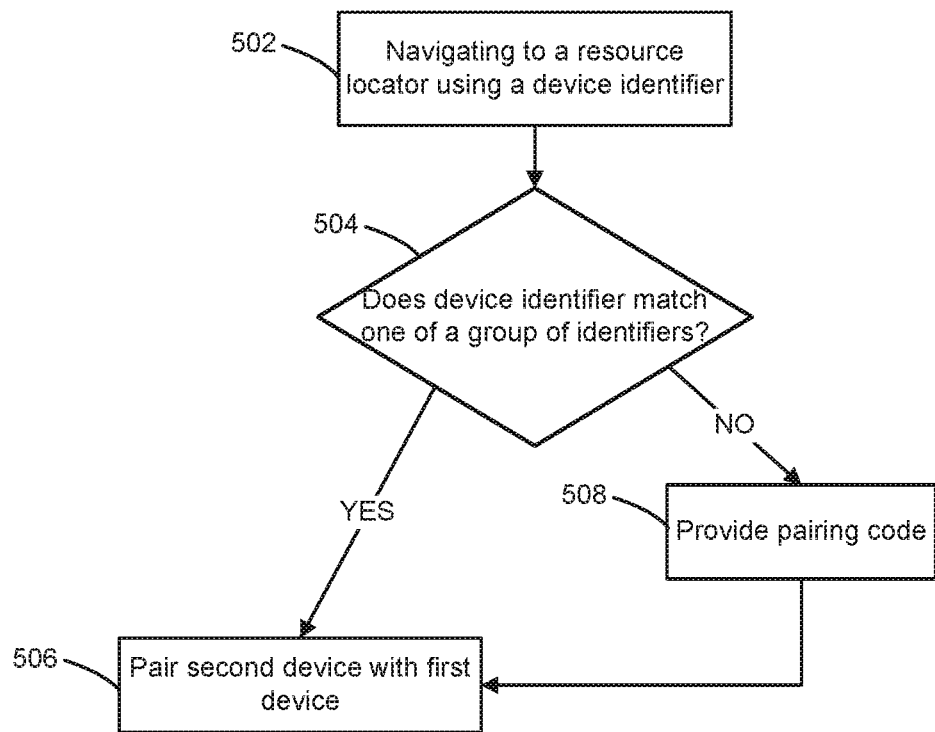
FIG. 5 is a flow chart of an example of a method.

FIG. 5 shows an example method. In step 502, a user may navigate to a resource locator, for example, using a mobile device. Accessing the resource locator using the mobile device facilitates exposure of a device identifier associated with the mobile device. For example, the user may leverage a web browser executing on the mobile device to navigate to the resource locator. As such, the web browser may provide a public facing IP address (e.g., the device identifier) to a web server hosting the resource locator. Accordingly, the device identifier may be compared to the one or more of a group of identifiers to determine if the device identifier matches one or more of the group of identifiers, at step 504.

One or more of the identifiers in the group of identifiers may be associated with one or more devices accessing a particular network, or device at a particular location. As an example, one or more devices accessing a network may be assigned one of a group of device identifiers such as IP addresses. The assigned device identifiers may be stored and/or may be transmitted, to an upstream device via a network, whereby the device identifier of the mobile device may be compared to the transmitted group of identifiers.

In response to a determination that the device identifier matches at least one of the group of identifiers, the mobile device may be paired with a first device, at step 506, to facilitate control of the one or more features of the application by the mobile device. The one or more features of the mobile device may comprise a game control, a content playback control, an audio control, and a screen navigation control. Other control features may be used. If the identifier does not match one or more of the group of identifiers, a paring code may be provided to the user, at step 508, which may be used to pair the second device to the first device, at step 506. Where the identifier does not match one or more of the group of identifiers, the first device may provide an additional or alternative pairing option to a user. Such an option may include displaying a pairing code that may be inputted to the second device in order to facilitate manual pairing between the first device and the second device.

Figure 6:
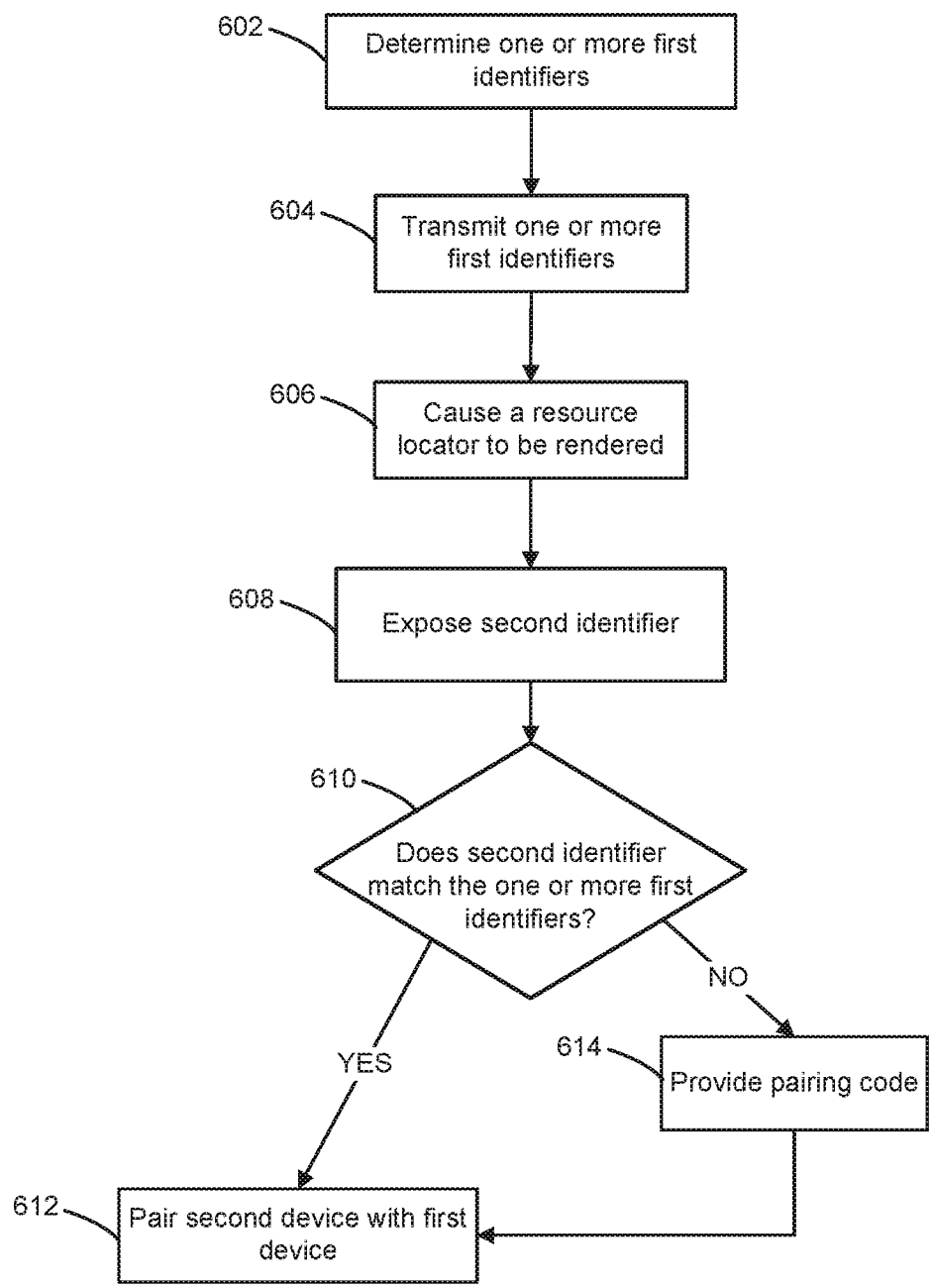
FIG. 6 is a flow chart of an example of a method.

FIG. 6 shows an example method. In step 602, one or more first identifiers associated with one or more devices accessing the premises network may be determined. As an example, the one or more devices accessing the premises network may be assigned one of a group of device identifiers such as IP addresses. The assigned device identifiers may be stored and/or may be transmitted, at step 604, to an upstream device via a network.

In step 606, a resource locator may be caused to be rendered on the display associated with the first device. As such, a user may input the resource locator into the second device or otherwise cause the second device to navigate to the resource locator. Additionally or alternatively, the resource locator may be automatically accessed by a second device without requiring the resource locator to be rendered on the display of the first device. For example, the resource locator may be provided to the second device without requiring a user input. Accessing the resource locator by the second device facilitates exposure of a second identifier associated with the second device, at 608. Accordingly, the second identifier may be compared to the one or more first identifiers to determine if the second identifier matches one or more of the first identifiers, at step 610.

In response to receiving an indication that the second identifier matches at least one of the first identifiers, the second device may be paired with the first device, at step 612, to facilitate control of the one or more features of the application by the second device. The one or more features of the first device may comprise a game control, a content playback control, an audio control, and a screen navigation control. Other control features may be used. If the second identifier does not match one or more of the first identifiers, a paring code may be provided to the user, at step 614, which may be used to pair the second device to the first device, at step 612.

Figure 7:
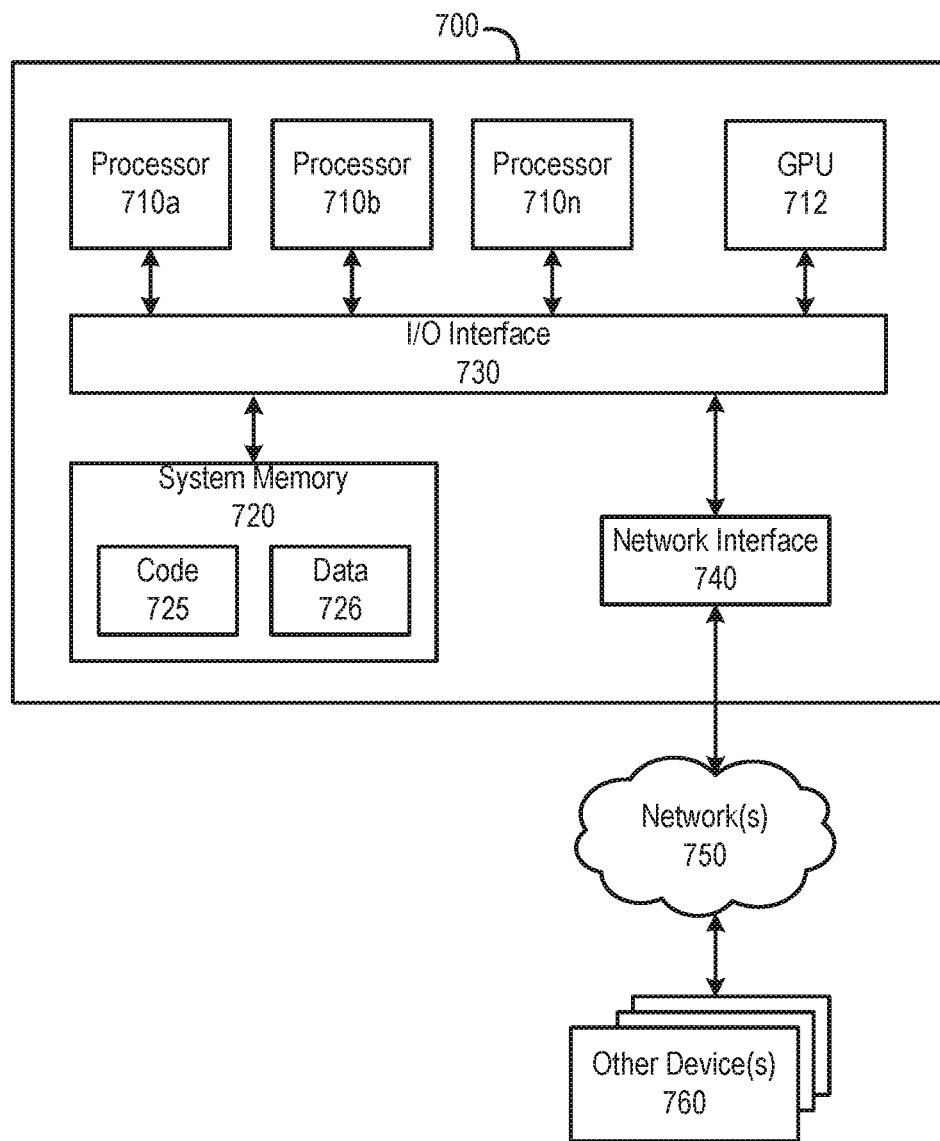
FIG. 7 is a block diagram of an example of a computing system.

FIG. 7 depicts a general-purpose computer system that includes or is configured to access one or more computer-accessible media. A computing device 700 may include one or more processors 710*a*, 710*b*, and/or 710*n* (which may be referred herein singularly as the processor 710 or in the plural as the processors 710) coupled to a system memory 720 via an input/output (I/O) interface 730. The computing device 700 may further include a network interface 740 coupled to an I/O interface 730.

The computing device 700 may be a uniprocessor system including one processor 710 or a multiprocessor system including several processors 710 (e.g., two, four, eight, or another suitable number). The processors 710 may be any suitable processors capable of executing instructions. For example, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

A graphics processing unit ("GPU") 712 may participate in providing graphics rendering and/or physics processing capabilities. A GPU may, for example, comprise a highly parallelized processor architecture specialized for graphical computations. The processors 710 and the GPU 712 may be implemented as one or more of the same type of device.

The system memory 720 may be configured to store instructions and data accessible by the processor(s) 710. The system memory 720 may be implemented using any suitable memory technology, such as static random access memory ("SRAM"), synchronous dynamic RAM ("SDRAM"), non-volatile/Flash®-type memory, or any other type of memory. Program instructions and data implementing one or more desired functions, such as those methods, techniques and data described above, are shown stored within the system memory 720 as code 725 and data 726.

The I/O interface 730 may be configured to coordinate I/O traffic between the processor(s) 710, the system memory 720 and any peripherals in the device, including an network interface 740 or other peripheral interfaces. The I/O interface 730 may perform any necessary protocol, timing or other data transformations to convert data signals from one component (e.g., the system memory 720) into a format suitable for use by another component (e.g., the processor 710). The I/O interface 730 may include support for devices attached through various types of peripheral buses, such as a variant of the Peripheral Component Interconnect (PCI) bus standard or the Universal Serial Bus (USB) standard, for example. The function of the I/O interface 730 may be split into two or more separate components, such as a north bridge and a south bridge, for example. Some or all of the functionality of the I/O interface 730, such as an interface to the system memory 720, may be incorporated directly into the processor 710.

The network interface 740 may be configured to allow data to be exchanged between the computing device 700 and other device or devices 760 attached to a network or networks 750, such as other computer systems or devices, for example. The network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

The system memory 720 may be or comprise a computer-accessible medium configured to store program instructions and data as described above for implementing methods and apparatus. However, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality; for example, software components running on a variety of different devices and servers may collaborate to provide the functionality. Portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

The methods and systems may employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining one or more first identifiers associated with one or more devices accessing a premises network, wherein a first device of the one or more devices is configured to execute an application comprising features capable of being controlled by another of the one or more devices accessing the premises network;
    receiving, by a network device and based on a second device accessing a resource locator associated with the network device, a second identifier associated with the second device;
    determining, by the network device, that the second identifier matches at least one of the one or more first identifiers; and
    causing, based on determining that the second identifier matches the at least one of the first identifiers, pairing of the second device with the first device to enable control of the one or more features of the application by the second device.

2. The method of claim 1, wherein the first device comprises a set-top box associated with a display and the application is outputted via the display.

3. The method of claim 1, wherein the premises network comprises a local area network and wherein the determining the one or more first identifiers comprises retrieving one or more Internet protocol (IP) addresses from a set of one or more IP addresses assigned by a gateway device associated with the premises network.

4. The method of claim 1, wherein the second device comprises a mobile device configured to access the resource locator.

5. The method of claim 1, wherein accessing the resource locator comprises causing the second device to navigate to the resource locator and to determine the second identifier of the second device.

6. The method of claim 1, wherein accessing the resource locator comprises receiving a user input comprising the resource locator.

7. The method of claim 1, wherein the one or more devices comprise the second device and wherein the one or more first identifiers comprise the second identifier.

8. A method comprising:
    causing, via a user device, output to a network device of an identifier associated with the user device based on the user device navigating to a resource locator associated with the network device, wherein output of the identifier to the network device causes the network device to, based on a determination that the identifier associated with the user device matches at least one identifier associated with one or more devices accessing a network, pair the user device with a computing device; and
    sending, by the user device, and based on the user device being paired with the computing device, a signal to cause control of an application executing on the computing device.

9. The method of claim 8, wherein the navigating to the resource locator comprises receiving a user input comprising the resource locator.

10. The method of claim 8, wherein the navigating to the resource locator comprises receiving the resource locator from a data store and automatically navigating to the resource locator.

11. The method of claim 8, wherein the resource locator comprises a universal resource locator.

12. The method of claim 8, wherein the user device comprises a mobile device.

13. The method of claim 8, wherein the user device being paired with the computing device is associated with a time limit, and wherein the user device and the computing device are unpaired at the expiration of the time limit.

14. The method of claim 8, wherein the one or more devices comprise the user device and wherein the at least one identifier comprises the identifier associated with the user device.

15. A method comprising:
    determining an identifier of a first device among one or more first identifiers associated with one or more devices accessing a network associated with a premises;
    receiving, by a network device, a second identifier associated with a second device based on the second device accessing a resource locator associated with the network device;
    comparing, by the network device, the one or more first identifiers to the second identifier; and causing, by the network device determining that the second identifier matches at least one of the first identifiers, pairing of the second device with the first device located at the premises to enable control of one or more features of the first device.

16. The method of claim 15, wherein the one or more first identifiers comprise Internet protocol addresses assigned to the one or more devices accessing the network.

17. The method of claim 15, wherein the accessing the resource locator comprises one or more of displaying the resource locator and enabling automatic navigation to a resource associated with the resource locator.

18. The method of claim 15, wherein the second identifier comprises a public-facing Internet protocol address.

19. The method of claim 15, wherein the first device is associated with a display configured to output content to a user, and wherein the second device, when paired with the first device, is configured to control the one or more features of the first device, and wherein the one or more features are associated with the outputted content.

20. The method of claim 15, wherein the one or more devices comprise the second device and wherein the one or more first identifiers comprise the second identifier.

* * * * *